United States Patent
Aso et al.

(10) Patent No.: US 12,081,097 B2
(45) Date of Patent: Sep. 3, 2024

(54) MOTOR, FAN, AND AIR CONDITIONER

(71) Applicant: Mitsubishi Electric Corporation, Tokyo (JP)

(72) Inventors: Hiroki Aso, Tokyo (JP); Ryogo Takahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 260 days.

(21) Appl. No.: 17/792,547

(22) PCT Filed: Feb. 28, 2020

(86) PCT No.: PCT/JP2020/008301
§ 371 (c)(1),
(2) Date: Jul. 13, 2022

(87) PCT Pub. No.: WO2021/171554
PCT Pub. Date: Sep. 2, 2021

(65) Prior Publication Data
US 2023/0081655 A1    Mar. 16, 2023

(51) Int. Cl.
*H02K 5/173* (2006.01)
*F24F 1/0018* (2019.01)
(Continued)

(52) U.S. Cl.
CPC ......... *H02K 5/1732* (2013.01); *F24F 1/0018* (2013.01); *H02K 7/083* (2013.01); *H02K 21/16* (2013.01)

(58) Field of Classification Search
CPC ....... H02K 5/1732; H02K 7/083; H02K 21/16
(Continued)

(56) References Cited

U.S. PATENT DOCUMENTS

| 2020/0028415 A1 | 1/2020 | Aso et al. |
| 2020/0067358 A1 | 2/2020 | Takahashi et al. |
| 2021/0234420 A1 | 7/2021 | Shimokawa et al. |

FOREIGN PATENT DOCUMENTS

| CN | 202840784 U | * | 3/2013 |
| JP | S60-141651 U | | 9/1985 |

(Continued)

OTHER PUBLICATIONS

Office Action issued on Nov. 24, 2022 in connection with counterpart Indian Patent Application No. 202227047998 (and English translation).

(Continued)

*Primary Examiner* — Jose A Gonzalez Quinones
(74) *Attorney, Agent, or Firm* — Posz Law Group, PLC

(57) ABSTRACT

A motor includes a rotor having a shaft, a rotor core, and a permanent magnet, and a stator surrounding the rotor. The permanent magnet forms a magnet magnetic pole, a part of the rotor core forms a virtual magnetic pole. The motor includes first and second bearings support the shaft, and further includes first and second bearing support portions. Of the first and second bearings, the first bearing is located on the load side. A distance D1 from the center axis to the inner circumferential surface of the first bearing support portion, a distance D2 from the center axis to the inner circumferential surface of the second bearing support portion, a distance d1 from the center axis to the outer circumferential surface of the first bearing, and a distance d2 from the center axis to the outer circumferential surface of the second bearing satisfy D1−d1<D2−d2.

13 Claims, 15 Drawing Sheets

(51) Int. Cl.
*H02K 7/08* (2006.01)
*H02K 21/16* (2006.01)

(58) Field of Classification Search
USPC .......................................... 310/90
See application file for complete search history.

(56) References Cited

FOREIGN PATENT DOCUMENTS

| | | | |
|---|---|---|---|
| JP | H11-187605 A | 7/1999 | |
| JP | 2002-078281 A | 3/2002 | |
| JP | 3791570 B2 * | 6/2006 | |
| JP | 2010-207073 A | 9/2010 | |
| JP | 2012-060772 A | 3/2012 | |
| JP | 2012-244777 A | 12/2012 | |
| JP | 2016127620 A * | 7/2016 | |
| WO | 2018/134988 A1 | 7/2018 | |
| WO | WO-2018179025 A1 * | 10/2018 | ............ F24F 1/0018 |
| WO | 2020/003341 A1 | 1/2020 | |

OTHER PUBLICATIONS

International Search Report of the international searching authority mailed Apr. 28, 2020 in connection with corresponding application No. PCT/JP2020/008301 (and English translation).

* cited by examiner

MOTOR, FAN, AND AIR CONDITIONER

This application is a U.S. national stage application of International Patent Application No. PCT/JP2020/008301 filed on Feb. 28, 2020, the disclosure of which is incorporated herein by reference.

TECHNICAL FIELD

The present disclosure relates to a motor, a fan, and an air conditioner.

BACKGROUND ART

A motor includes a rotor having a shaft, and a stator. A bearing that supports the shaft is held by a bearing support portion such as a bracket (for example, see Patent Document 1).

PATENT REFERENCE

Patent Document 1: Japanese Utility Model Publication No. 60-141651 (FIG. 1)

Recently, a consequent pole rotor has been developed in which a permanent magnet forms a magnet magnetic pole, and a part of a rotor core forms a virtual magnetic pole. In the consequent pole rotor, the magnet magnetic pole and the virtual magnetic pole have different magnetic flux densities on the rotor surface, and thus an excitation force in the radial direction is likely to be applied to the rotor. As a result, a load in the radial direction applied to a bearing that supports a shaft tends to increase.

If a large load in the radial direction is applied to the bearing supporting the shaft, outer circumferential creep may occur. The outer circumferential creep is a phenomenon in which an outer ring of the bearing moves in the circumferential direction relative to the bearing support portion. Since the outer circumferential creep leads to wear of the bearing, it is required to suppress the occurrence of the outer circumferential creep.

SUMMARY

The present disclosure is made to solve the above-described problem, and has an object to suppress the occurrence of the outer circumferential creep.

A motor according to the present disclosure includes a rotor having a shaft, a rotor core surrounding the shaft from outside in a radial direction about a center axis of the shaft, and a permanent magnet attached to the rotor core, the permanent magnet forming a magnet magnetic pole, a part of the rotor core forming a virtual magnetic pole, a stator surrounding the rotor from outside in the radial direction, a first bearing and a second bearing supporting the shaft, a first bearing support portion having an inner circumferential surface facing an outer circumferential surface of the first bearing, and a second bearing support portion having an inner circumferential surface facing an outer circumferential surface of the second bearing. One side of the shaft in a direction of the center axis is defined as a load side to which a load is applied. Of the first bearing and the second bearing, the first bearing is located on the load side. A distance $D1$ from the center axis to the inner circumferential surface of the first bearing support portion, a distance $D2$ from the center axis to the inner circumferential surface of the second bearing support portion, a distance $d1$ from the center axis to the outer circumferential surface of the first bearing, and a distance $d2$ from the center axis to the outer circumferential surface of the second bearing satisfy $D1-d1<D2-d2$. Further, $D1<D2$ and $d1=d2$ are both satisfied, or $d1>d2$ is satisfied.

In the present disclosure, since the distances $D1$, $D2$, $d1$, and $d2$ satisfy $D1-d1<D2-d2$, the outer ring of the first bearing applied with a larger load in the radial direction is less likely to move in the circumferential direction. Therefore, the occurrence of the outer circumferential creep can be suppressed.

DETAILED DESCRIPTION

First Embodiment (Configuration of Motor 100)

Figure 1:
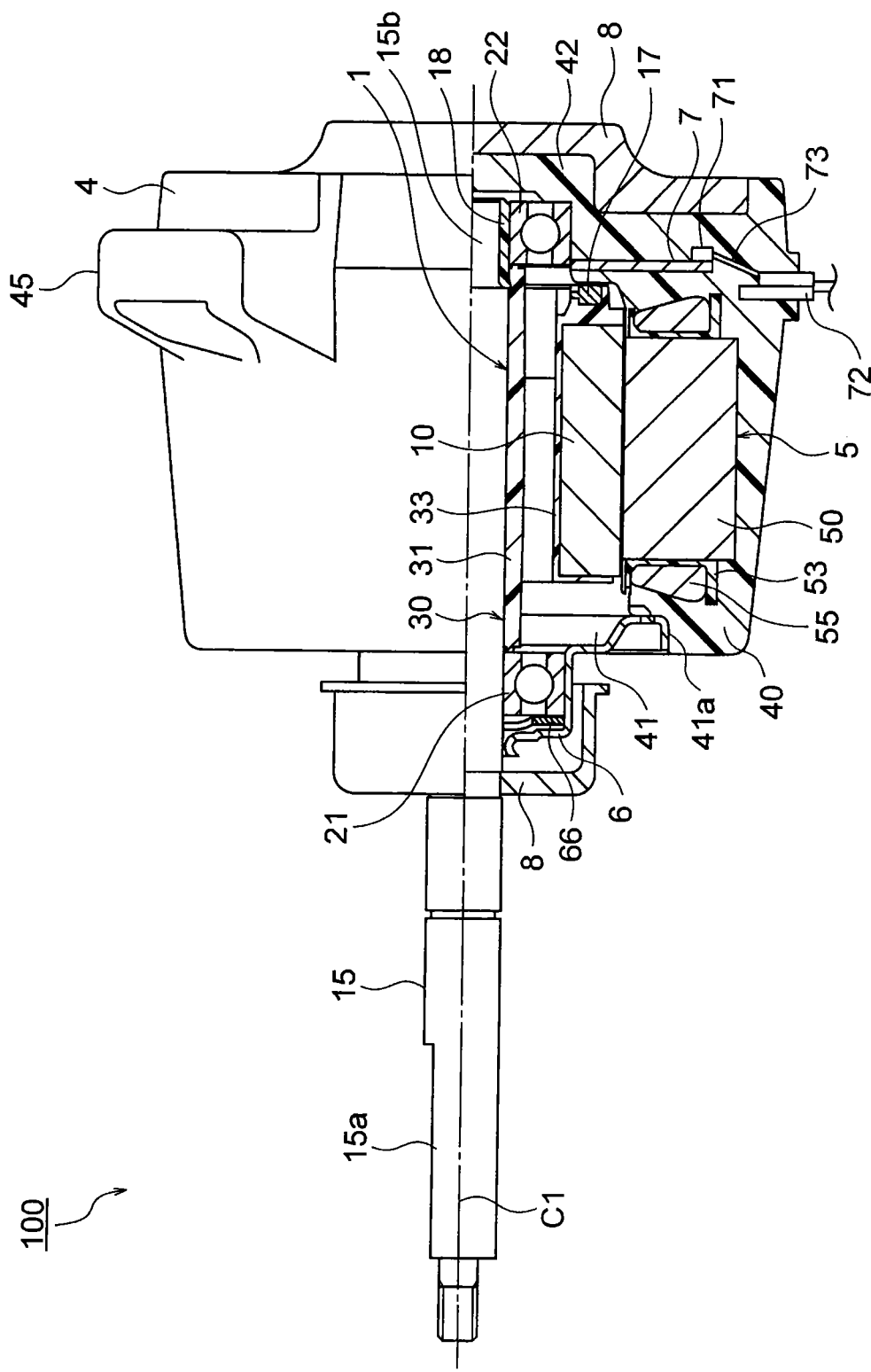
FIG. 1 is a longitudinal partial sectional view illustrating a motor according to a first embodiment.

FIG. 1 is a longitudinal sectional view illustrating a motor 100 according to the first embodiment. The motor 100 is used, for example, for a fan of an air conditioner. The motor 100 is an interior permanent magnet (IPM) motor in which permanent magnets 16 are embedded in a rotor 1.

The motor 100 includes the rotor 1 having a shaft 15 which is a rotary shaft, and a mold stator 4 surrounding the rotor 1. The mold stator 4 includes a stator 5 provided to surround the rotor 1, and a mold resin portion 40 covering the stator 5.

In the following description, the direction of the center axis C1 of the shaft 15 is referred to as an "axial direction." The circumferential direction about the center axis C1 is referred to as a "circumferential direction" and is indicated by an arrow R1 in FIG. 2 and other figures. The radial direction about the center axis C1 is referred to as a "radial direction." A sectional view in a plane parallel to the axial direction is referred to as a "longitudinal sectional view," and a sectional view in a plane orthogonal to the axial direction is referred to as a "cross-sectional view."

The shaft 15 receives a load on one side in the axial direction. More specifically, the shaft 15 protrudes from the mold stator 4 to the left side in FIG. 1, and, for example, an impeller 505 of a fan (FIG. 16(A)) is attached to an attachment portion 15a formed at the tip of the shaft 15 on the protruding side. Thus, the protruding side of the shaft 15 is referred to as a "load side" and the opposite side of the shaft 15 is referred to as a "counter-load side."

(Configuration of Mold Stator 4)

The mold stator 4 includes the stator 5 and the mold resin portion 40, as described above. The mold resin portion 40 is composed of a thermosetting resin such as a bulk molding compound (BMC). Alternatively, the mold resin portion 40 may be composed of a thermoplastic resin such as polybutylene terephthalate (PBT) or polyphenylene sulfide (PPS).

The mold resin portion 40 has attachment legs 45 on its outer circumference. In this example, four attachment legs 45 are formed at equal intervals in the circumferential direction. Holes 46 (FIG. 6) through which screws are inserted are formed in the attachment legs 45. The attachment legs 45 are fixed to, for example, a frame of an outdoor unit of the air conditioner with screws inserted through the holes 46.

The mold resin portion 40 has an opening 41 on the load side. The rotor 1 is inserted into the hollow portion inside the mold stator 4 through the opening 41. A bracket 6 serving as a first bearing support portion is attached to the opening 41 of the mold resin portion 40. The bracket 6 is composed of a metal such as a galvanized steel sheet. The bracket 6 is fitted to an annular step portion 41a formed around the opening 41.

The bracket 6 holds a first bearing 21 that supports the shaft 15. A waterproof cap 9 for preventing water or the like from entering the first bearing 21 is attached to the shaft 15 so as to surround the bracket 6 from outside.

The mold resin portion 40 has a bearing support portion 42 serving as a second bearing support portion on the counter-load side. The bearing support portion 42 of the mold resin portion 40 holds a second bearing 22 that supports the shaft 15.

A circuit board 7 is disposed on the outer side of the second bearing 22 in the radial direction. The circuit board 7 is covered with and held by the mold resin portion 40. A device 71 such as a power transistor for driving the motor 100, a magnetic sensor, and the like are mounted on the circuit board 7. Lead wires 73 are wired on the circuit board 7. The lead wires 73 on the circuit board 7 are drawn out to the outside of the motor 100 through an outlet part 72 attached to an outer circumferential portion of the mold resin portion 40.

A heat dissipation plate 8 is provided so as to cover the counter-load side of the mold resin portion 40. The heat dissipation plate 8 is partially covered with the mold resin portion 40 and partially exposed from the mold resin portion 40. The heat dissipation plate 8 dissipates heat generated by the motor 100 to the outside. It is also possible not to provide the heat dissipation plate 8.

(Configuration of Stator 5)

Figure 2:
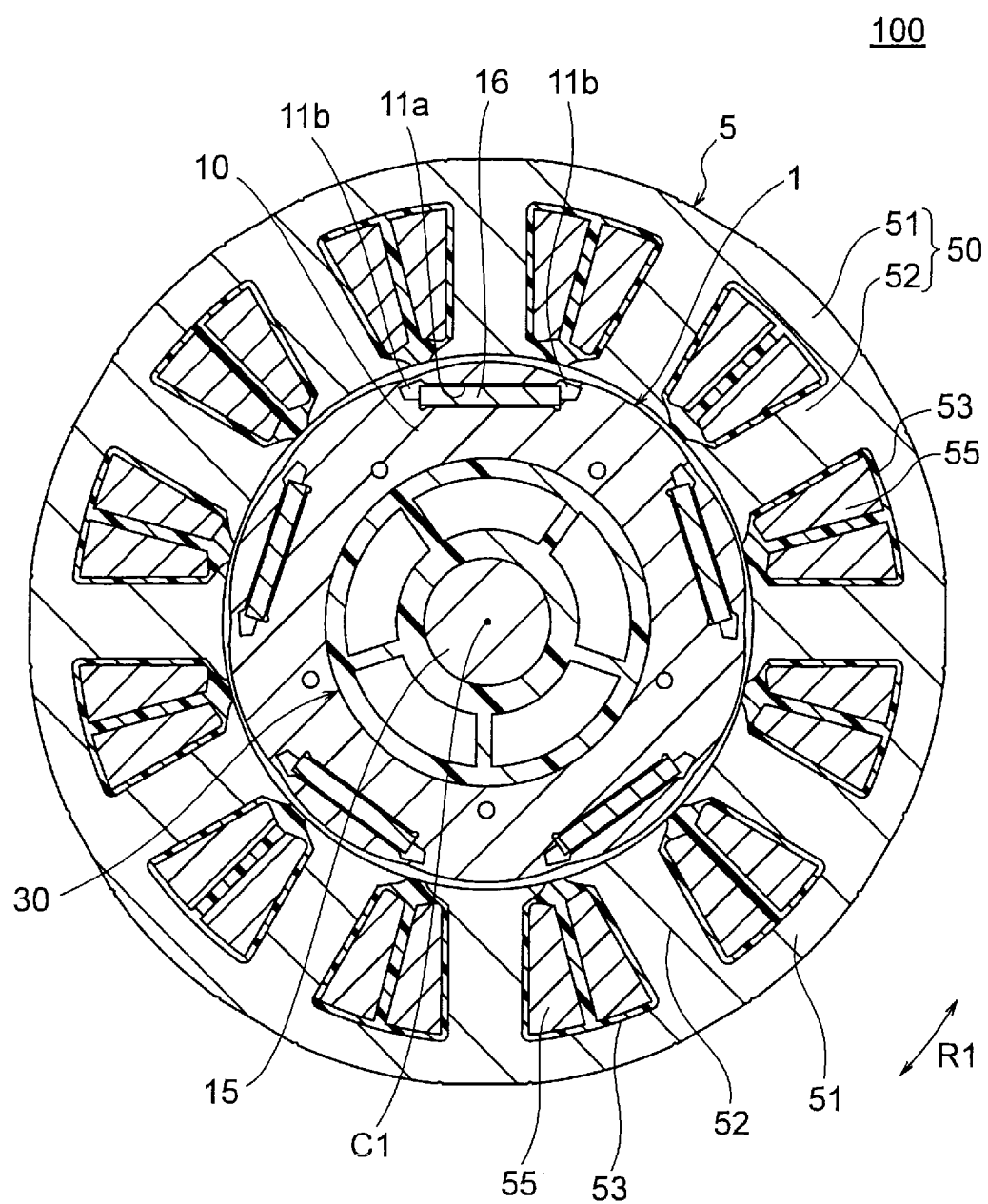
FIG. 2 is a cross-sectional view illustrating the motor according to the first embodiment.

FIG. 2 is a cross-sectional view illustrating the motor 100. As illustrated in FIG. 2, the stator 5 includes a stator core 50, an insulating portion 53 provided on the stator core 50, and coils 55 wound on the stator core 50 via the insulating portion 53. The stator core 50 is formed by stacking a plurality of electromagnetic steel sheets in the axial direction and fixing them by crimping or the like. The thickness of each electromagnetic steel sheet is, for example, 0.2 to 0.5 mm.

The stator core 50 includes a yoke 51 in an annular shape about the center axis C1 and a plurality of teeth 52 extending inward in the radial direction from the yoke 51. The teeth 52 are arranged at equal intervals in the circumferential direction. The number of teeth 52 is 12 in this example, but is not limited to 12. Slots that are spaces for accommodating the coils 55 are formed each between adjacent teeth 52.

The insulating portion 53, which is made of, for example, polybutylene terephthalate (PBT), is attached to the stator core 50. The insulating portion 53 is composed of a thermoplastic resin such as PBT. The insulating portion 53 is obtained by molding the thermoplastic resin integrally with the stator core 50 or assembling a molded body of the thermoplastic resin to the stator core 50.

(Configuration of Rotor 1)

Figure 3:
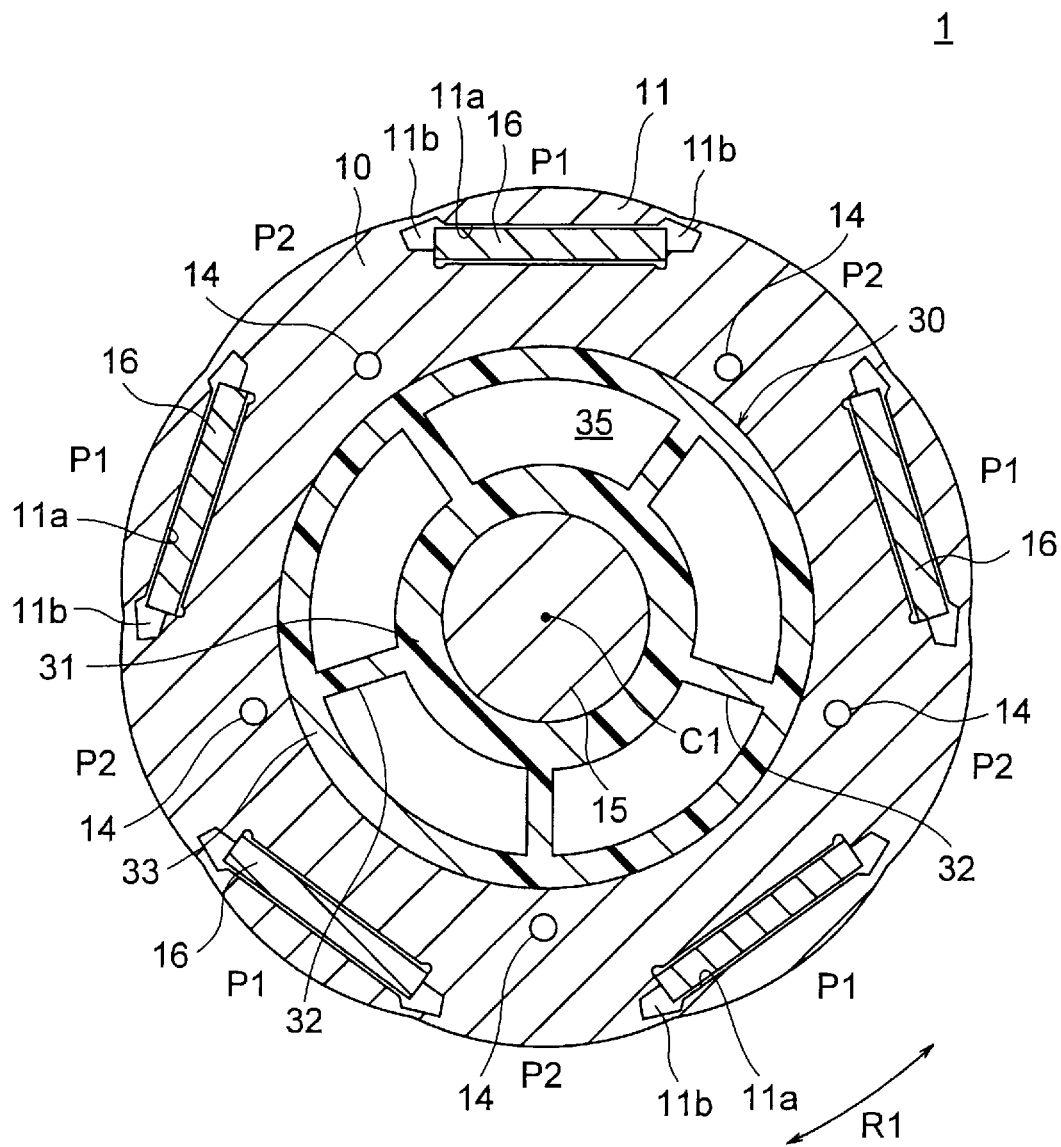
FIG. 3 is a cross-sectional view illustrating a rotor according to the first embodiment.

FIG. 3 is a cross-sectional view illustrating the rotor 1. As illustrated in FIG. 3, the rotor 1 includes the shaft 15, a rotor core 10 surrounding the shaft 15 from outside in the radial direction, and the plurality of permanent magnets 16 embedded in the rotor core 10.

The rotor core 10 is a member in an annular shape about the center axis C1. The rotor core 10 is formed by stacking a plurality of electromagnetic steel sheets in the axial direction and fixing them by crimping or the like. The thickness of each electromagnetic steel sheet is, for example, 0.2 to 0.5 mm.

The rotor core 10 has a plurality of magnet insertion holes 11a. The magnet insertion holes 11a are arranged at equal intervals in the circumferential direction and at equal distances from the center axis C1. In this example, the number of the magnet insertion holes 11a is five. The magnet insertion holes 11a are formed along the outer circumference of the rotor core 10.

Each magnet insertion hole 11a extends linearly in a direction orthogonal to a line in the radial direction (referred to as a magnetic pole center line) passing through a pole center, i.e., the center of the magnet insertion hole 11a in the circumferential direction. However, the magnet insertion hole 11a is not limited to such a shape, and may extend, for example, in a V-shape.

Flux barriers 11b which are holes are formed at both ends of each magnet insertion hole 11a in the circumferential direction. Thin portions are formed between the flux barriers 11b and the outer circumference of the rotor core 10. To suppress the leakage flux between adjacent magnetic poles, the thickness of the thin portion is desirably the same as the thickness of each electromagnetic steel sheet of the rotor core 10.

The permanent magnets 16 are inserted into the magnet insertion holes 11a. Each permanent magnet 16 is in the form of a flat plate and has a rectangular cross-sectional shape in a plane orthogonal to the axial direction. The permanent magnet 16 is composed of a rare earth magnet.

More specifically, the permanent magnet 16 is composed of a neodymium sintered magnet containing Nd (neodymium)-Fe (iron)-B (boron).

The permanent magnets 16 are arranged so that the same magnetic poles (for example, N poles) face the outer circumferential side of the rotor core 10. In the rotor core 10, magnetic poles (for example, S poles) opposite to the permanent magnets are formed in the regions each between the permanent magnets adjacent to each other in the circumferential direction.

Thus, the rotor 1 includes five magnet magnetic poles P1 formed by the permanent magnets 16 and five virtual magnetic poles P2 formed by the rotor core 10. Such a configuration is referred to as a consequent pole type. Hereinafter, when the term "magnetic pole" is simply used, it refers to either the magnetic pole P1 or the virtual pole P2. The rotor 1 has 10 magnetic poles.

Although the number of poles of the rotor 1 is 10 in this example, the number of poles of the rotor 1 may be four or any larger even number. Although one permanent magnet 16 is disposed in each magnet insertion hole 11a in this example, two or more permanent magnets 16 may be disposed in each magnet insertion hole 11a. The magnetic poles P1 may be S poles, and the virtual poles P2 may be N poles.

The outer circumference of the rotor core 10 has a so-called flower shape in a plane orthogonal to the axial direction. In other words, the outer circumference of the rotor core 10 has a maximum outer diameter at the pole center of each of the magnetic poles P1 and P2 and a minimum outer diameter at each inter-pole portion M, and extends in an arc shape from the pole center to the inter-pole portion M. The shape of the outer circumference of the rotor core 10 is not limited to the flower shape, but may be a circular shape.

In the rotor core 10, crimping portions 14 are provided on the inner side of the magnet insertion holes 11a in the radial direction. The crimping portions 14 are portions by which the electromagnetic steel sheets constituting the rotor core 10 are fixed.

A resin part 30 is provided between the inner circumference of the rotor core 10 and the shaft 15. The resin part 30 is composed of, for example, a resin such as polybutylene terephthalate (PBT). The resin part 30 has an annular inner cylindrical portion 31 fixed to the shaft 15, an annular outer cylindrical portion 33 fixed to the inner circumference of the rotor core 10, and a plurality of ribs 32 connecting the inner cylindrical portion 31 and the outer cylindrical portion 33.

The shaft 15 is fixed inside the inner cylindrical portion 31 of the resin part 30. The ribs 32 are arranged at equal intervals in the circumferential direction and extend radially outward in the radial direction from the inner cylindrical portion 31. Hollow portions 35 are famed each between the ribs 32 adjacent to each other in the circumferential direction. In this example, the number of ribs 32 is half the number of poles, and the positions of the ribs 32 in the circumferential direction coincide with the pole centers of the virtual magnetic poles P2, but the number and arrangement of the ribs 32 are not limited to the examples described above.

With reference to FIG. 1 again, a sensor magnet 17 is disposed on the counter-load side of the rotor core 10. The sensor magnet 17 is held by the resin part 30. The magnetic field of the sensor magnet 17 is detected by a magnetic sensor mounted on the circuit board 7, whereby the rotational position of the rotor 1 is detected.

(Bearings 21 and 22 and their Support Structures)

Figure 4:
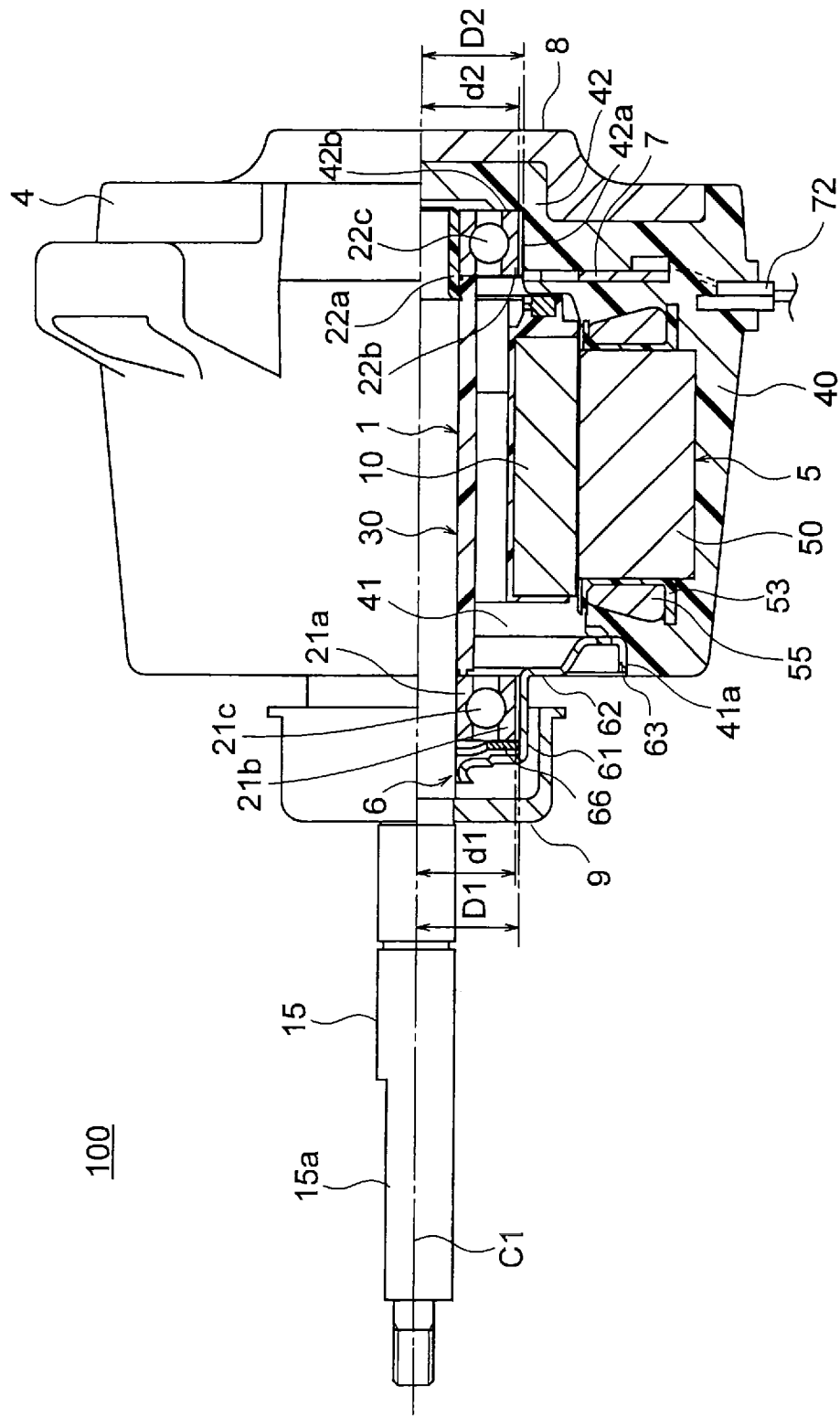
FIG. 4 is a longitudinal partial sectional view illustrating the motor according to the first embodiment.

Nest, the bearings 21 and 22 that rotatably support the shaft 15 and a supporting structure for the bearings 21 and 22 will be described. FIG. 4 is a longitudinal partial sectional view illustrating the motor 100. The shaft 15 is rotatably supported by the first bearing 21 and the second bearing 22, as described above. The first bearing 21 is disposed on the load side, and the second bearing 22 is disposed on the counter-load side.

The first bearing 21 includes an inner ring 21a, an outer ring 21b, and a plurality of rolling elements 21c. The inner ring 21a is fixed to the shaft 15 by press-fitting. The outer ring 21b is fixed to a cylindrical portion 61 (described below) of the bracket 6 by gap-fitting. The rolling elements 21c are, for example, balls and are disposed between the inner ring 21a and the outer ring 21b. Each of the inner ring 21a, the outer ring 21b, and the rolling elements 21c is composed of a metal.

The second bearing 22 includes an inner ring 22a, an outer ring 22b, and a plurality of rolling elements 22c. The inner ring 22a is fixed to the shaft 15 by press-fitting. The outer ring 22b is fixed to the bearing support portion 42 of the mold resin portion 40 by gap-fitting. The rolling elements 22c are, for example, balls and are disposed between the inner ring 22a and the outer ring 22b. Each of the inner ring 22a, the outer ring 22b, and the rolling elements 22c is composed of a metal.

Figure 5A:
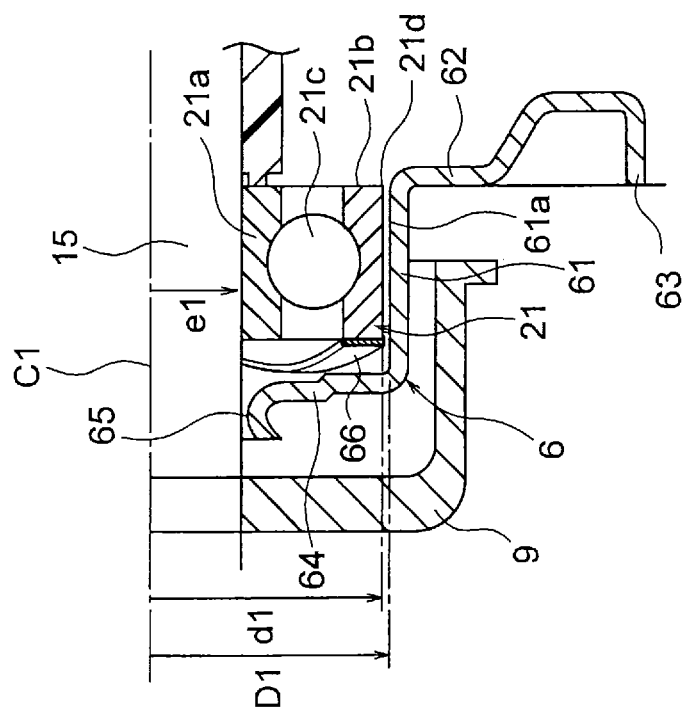
FIG. 5(A) is a diagram illustrating a first bearing and a first bearing support portion of the first embodiment.

FIG. 5(A) is a sectional view illustrating the first bearing 21 and the bracket 6. The bracket 6 has a cylindrical portion 61 surrounding the first bearing 21 and a flange portion 62 extending outward in the radial direction from the cylindrical portion 61. The inner circumferential surface 61a of the cylindrical portion 61 faces an outer circumferential surface 21d of the outer ring 21b of the first bearing 21 (also referred to as the outer circumferential surface 21d of the first bearing 21).

An annular fitting portion 63 is formed on the outer circumference of the flange portion 62, and the fitting portion 63 is fitted to the step portion 41a (FIG. 4) of the mold resin portion 40. The bracket 6 is fixed to the mold resin portion 40 by fitting the fitting portion 63 to the step portion 41a.

The bracket 6 further has an end surface portion 64 facing the end surface of the first bearing 21 in the axial direction. A shaft insertion hole 65 through which the shaft 15 passes is formed at the center of the end surface portion 64. A washer 66 that urges the outer ring 21b of the first bearing 21 in the axial direction is disposed between the end surface portion 64 and the first bearing 21.

The distance from the center axis C1 to the outer circumferential surface 21d of the outer ring 21b of the first bearing 21 is defined as a distance d1. The distance from the center axis C1 to the inner circumferential surface 61a of the cylindrical portion 61 of the bracket 6 is defined as a distance D1. The distance D1 is larger than the distance d1.

The difference (D1−d1) between the distance D1 and the distance d1 is a gap between the outer circumferential surface 21d of the outer ring 21b of the first bearing 21 and the inner circumferential surface 61a of the cylindrical portion 61 of the bracket 6 and is, for example, 5 μm.

Figure 5B:
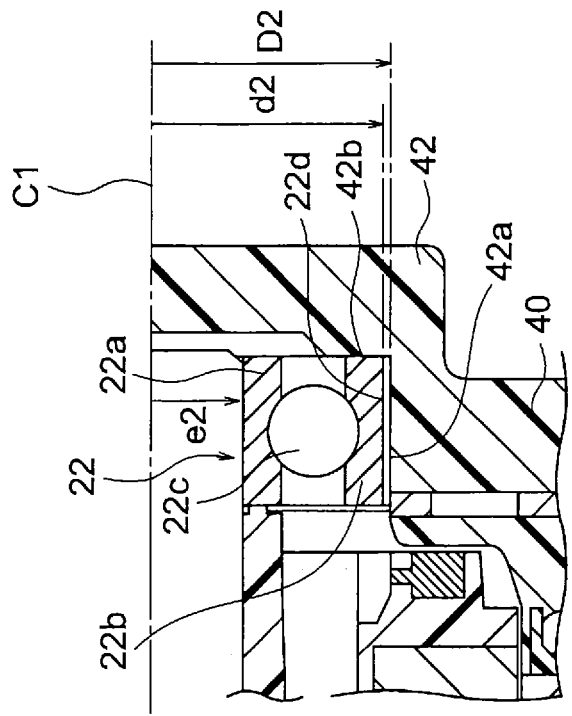
FIG. 5(B) is a diagram illustrating a second bearing and a second bearing support portion.

FIG. 5(B) is a sectional view illustrating the second bearing 22 and the bearing support portion 42. The bearing support portion 42 has an inner circumferential surface 42a surrounding the second bearing 22 and an end surface 42b in contact with the outer ring 22b of the second bearing 22 in the axial direction. The inner circumferential surface 42a of the bearing support portion 42 faces an outer circumferential surface 22d of the outer ring 22b of the second bearing 22 (also referred to as the outer circumferential surface 22d of the second bearing 22).

The distance from the center axis C1 to the outer circumferential surface 22d of the outer ring 22b of the second bearing 22 is defined as a distance d2. The distance from the center axis C1 to the inner circumferential surface 42a of the bearing support portion 42 is defined as a distance D2. The distance D2 is larger than the distance d2.

The difference (D2−d2) between the distance D2 and the distance d2 is a gap between the outer circumferential surface 22d of the outer ring 22b of the second bearing 22 and the inner circumferential surface 42a of the bearing support portion 42 and is, for example, 10 μm.

In the first embodiment, D1−d1<D2−d2 is satisfied. That is, the gap on the outer circumferential side of the outer ring 21b of the first bearing 21 on the load side is narrower than the gap on the outer circumferential side of the outer ring 22b of the second bearing 22 on the counter-load side.

Figure 6:
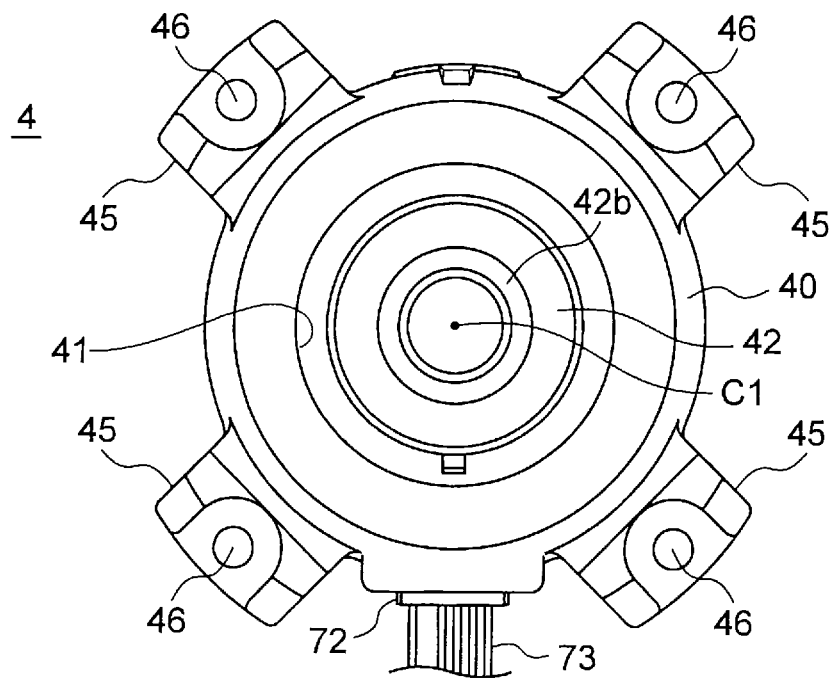
FIG. 6 is a view of a mold stator according to the first embodiment as viewed from the load side.

FIG. 6 is a view of the mold stator 4 as viewed from the load side. In FIG. 6, the rotor 1 is not yet inserted into the mold stator 4, and thus the bearing support portion 42 is exposed through the opening 41 of the mold resin portion 40.

Figure 7:
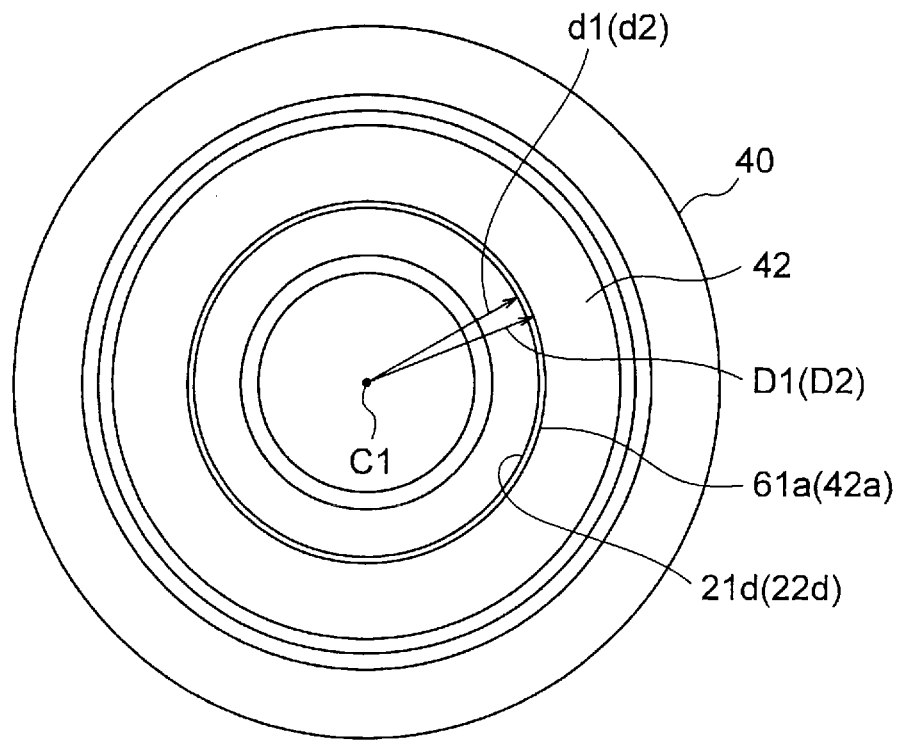
FIG. 7 is an enlarged view illustrating a part of the motor of FIG. 6.

FIG. 7 is an enlarged view illustrating the central portion in the radial direction of the mold stator 4 illustrated in FIG. 6. FIG. 7 illustrates both a circle representing the inner circumferential surfaces 61a and 42a of the bearing support portions 6 and 42 and a circle representing the outer circumferential surfaces 21d and 22d of the outer rings 21b and 22b of the bearings 21 and 22.

(Operation)

Figure 8:
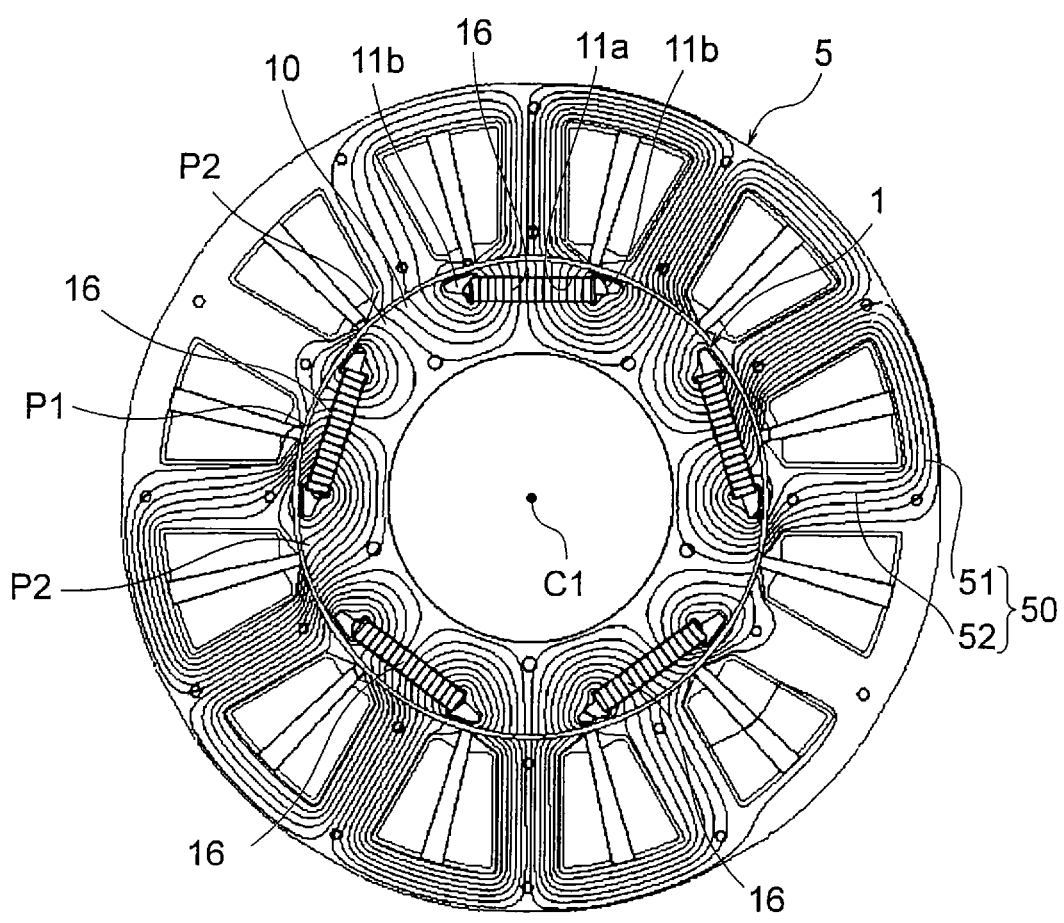
FIG. 8 is a flux diagram illustrating the flow of magnetic flux in the motor.

Next, the operation of the first embodiment will be described. FIG. 8 is a flux diagram illustrating a flux flow in the motor 100 including the consequent pole rotor 1.

The consequent pole rotor 1 has the magnet magnetic poles P1 at which the permanent magnets 16 are provided and the virtual magnetic poles P2 at which the permanent magnets 16 are not provided, as described above. The magnetic flux density on the surface of the rotor 1 is higher at the magnet magnetic poles P1 and is lower at the virtual magnetic poles P2.

As a result, the force acting between the magnet magnetic poles P1 and the teeth 52 is larger than the force acting between the virtual magnetic poles P2 and the teeth 52, and an excitation force in the radial direction is applied to the rotor 1. The excitation force in the radial direction applied to the rotor 1 is applied to the shaft 15.

Figure 9:
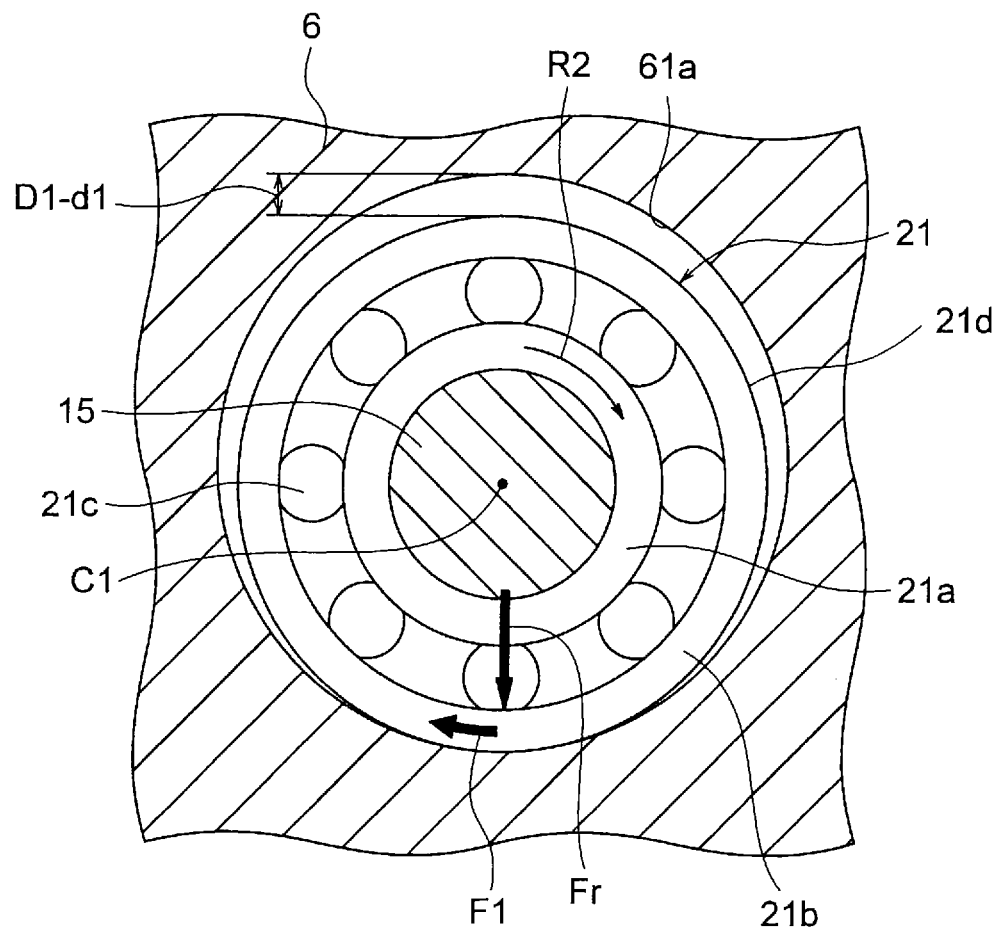
FIG. 9 is a schematic diagram illustrating a shaft, the first bearing, and a bracket.

FIG. 9 is a schematic view illustrating the shaft 15, the first bearing 21, and the bracket 6 holding the first bearing 21. In this regard, the gap (D1−d1) between the outer circumferential surface 21d of the outer ring 21b of the first bearing 21 and the inner circumferential surface 61a of the bracket 6 is shown exaggerated in FIG. 9.

The inner ring 21a of the first bearing 21 is fixed to the shaft 15 by press-fitting, while the outer ring 21b is fixed to the bracket 6 by gap-fitting. Thus, there is a difference between the circumferential length of the outer circumferential surface 21d of the outer ring 21b of the first bearing 21 and the circumferential length of the inner circumferential surface 61a of the bracket 6.

When the shaft 15 rotates in the direction indicated by the arrow R2 in a state in which the load Fr in the radial direction is applied to the first bearing 21, the outer ring 21b moves in the circumferential direction relative to the inner circumferential surface 61a of the bracket 6 as indicated by the arrow F1 due to the load Fr in the radial direction and the difference in the circumferential lengths. This phenomenon is referred to as outer circumferential creep.

In particular, the weight of the impeller 505 attached to the shaft 15 is applied to the first bearing 21 disposed on the load side in addition to the excitation force in the radial direction generated by the rotor 1. Thus, the load Fr in the radial direction applied to the first bearing 21 is larger than the load Fr in the radial direction applied to the second bearing 22.

In the first embodiment, the bearings 21 and 22 and the bearing support portions 6 and 42 are configured so that the distances D1, D2, d1, and d2 satisfy D1−d1<D2−d2. That is, the gap on the outer circumferential side of the outer ring 21b of the first bearing 21 is narrower than the gap on the outer circumferential side of the outer ring 22b of the second bearing 22.

Thus, the outer ring 21b of the first bearing 21 is less likely to move in the circumferential direction in the bracket 6. That is, it is possible to suppress the occurrence of the outer circumferential creep of the first bearing 21 to which the larger radial load Fr is applied.

It is conceivable that the relationship D1−d1<D2−d2 is satisfied, for example, when the distances D1 and D2 satisfy D1<D2 or when the distances d1 and d2 satisfy d1>d2.

For example, if the inner diameter of the cylindrical portion 61 of the bracket 6 is made smaller than the inner diameter of the bearing support portion 42, the distances D1 and D2 satisfy D1<D2. In such a case, as long as D1−d1<D2−d2 is satisfied, a large/small relationship between the distances d1 and d2 does not matter. For example, the distances d1 and d2 may be the same (d1=d2). With this configuration, the bearings 21 and 22 can be made to have the same outer diameter, and thereby the manufacturing cost can be reduced.

If the outer diameter of the outer ring 21b of the first bearing 21 is larger than the outer diameter of the outer ring 22b of the second bearing 22, the distances d1 and d2 satisfy d1>d2. In such a case, as long as D1−d1<D2−d2 is satisfied, a large/small relationship between the distances D1 and D2 does not matter. For example, the distances D1 and D2 may be the same (D1=D2). With this configuration, the cylindrical portion 61 of the bracket 6 and the bearing support portion 42 can be made to have the same inner diameter, and thereby the manufacturing cost can be reduced.

As illustrated in FIGS. 5(A) and 5(B), the distance e1 from the center axis C1 to the inner circumferential surface of the inner ring 21a of the first bearing 21 and the distance e2 from the center axis C1 to the inner circumferential surface of the inner ring 22a of the second bearing 22 are the same. In other words, the inner diameter (2×e1) of the first bearing 21 and the inner diameter (2×e2) of the second bearing 22 are the same.

Thus, in the shaft 15, the outer diameter of the portion supported by the first bearing 21 can be made equal to the outer diameter of the portion supported by the second bearing 22. Thus, the manufacturing cost can be reduced.

(Configuration for Suppressing Shaft Current)

Suppression of a shaft current in the motor 100 will now be described. When the motor 100 is driven by an inverter, the carrier frequency is set to a frequency higher than the audible frequency in order to suppress noise accompanying switching. However, as the carrier frequency increases, a voltage called a shaft voltage is generated in the shaft 15 by the high-frequency induction.

When the shaft voltage increases, the potential difference between the inner rings 21a and 22a and the outer rings 21b and 22b of the bearings 21 and 22 supporting the shaft 15 increases, and the current is likely to flow to the shaft 15 through the bearings 21 and 22. Such a current is referred to as a shaft current. When the shaft current is generated, damage known as electrolytic corrosion occurs on the raceway surfaces of the inner rings 21a and 22a, the raceway surfaces of the outer rings 21b and 22b, and the rolling surfaces of the rolling elements 21c and 22c.

Figure 10:
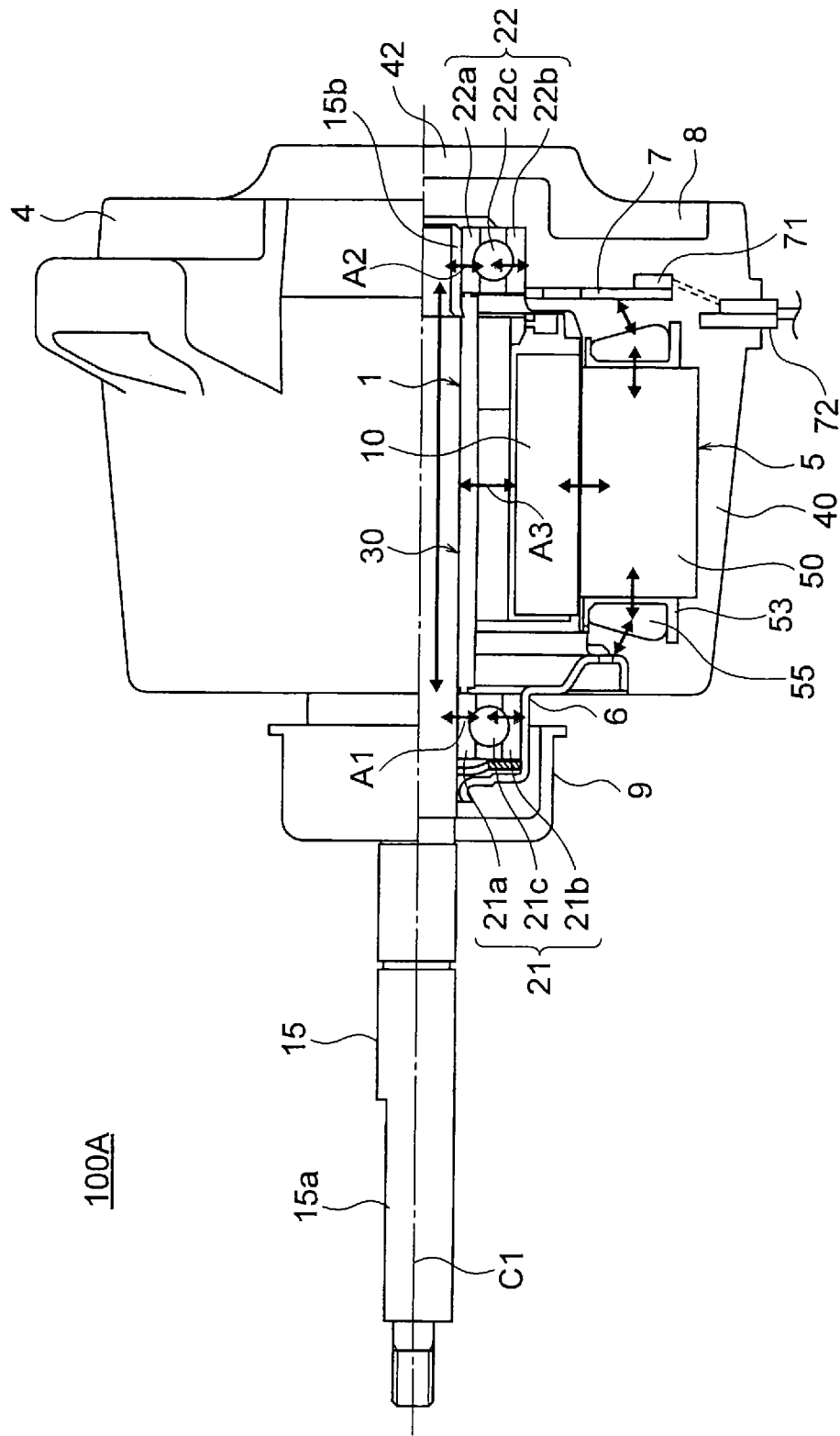
FIG. 10 is a diagram illustrating a configuration for suppressing a shaft current in the first embodiment.

FIG. 10 is a schematic diagram for describing a current flow when the shaft current is generated. As indicated by the arrows in FIG. 10, there are a path A1 flowing from the stator 5 to the shaft 15 via the bracket 6 and the first bearing 21, a path A2 flowing from the stator 5 to the shaft 15 via the circuit board 7 and the second bearing 22, and a path A3 flowing from the stator 5 to the shaft 15 via the rotor core 10.

Figure 11:
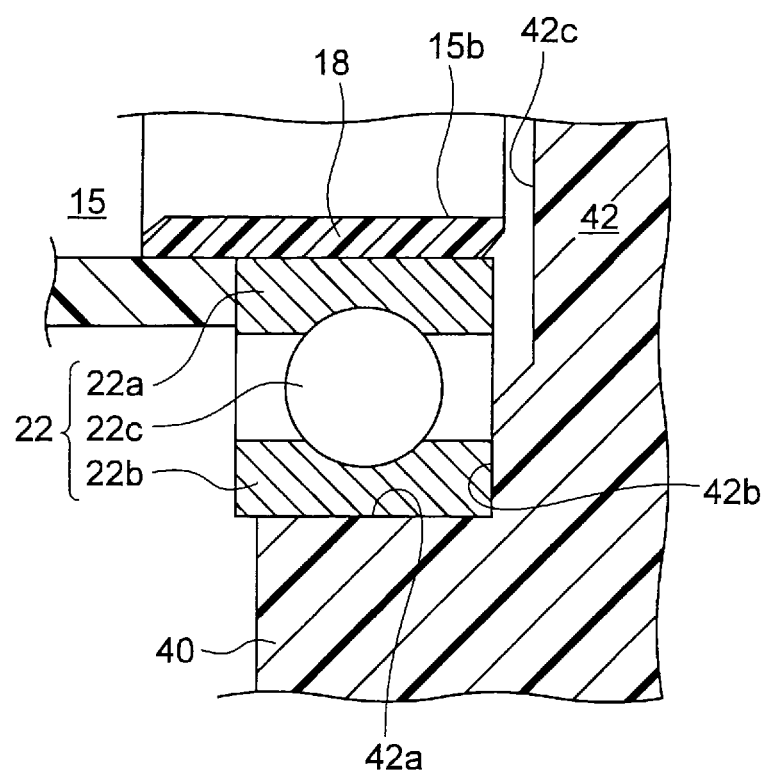
FIG. 11 is a sectional view illustrating the shaft and the second bearing of the first embodiment.

In the first embodiment, an insulator 18 is provided between the shaft 15 and the second bearing 22, as illustrated in FIG. 11. More specifically, the outer diameter of an end portion 15b on the counter-load side of the shaft 15 is reduced, and the cylindrical insulator 18 is attached to the end portion 15b. The insulator 18 is composed of a thermoplastic resin such as BMC.

Since the shaft 15 and the second bearing 22 can be electrically insulated from each other by the insulator 18, the flow of the current through the path A2 can be suppressed.

In the rotor 1, since the resin part 30 is disposed between the rotor core 10 and the shaft 15, the current flow from the rotor core 10 to the shaft 15 can be suppressed. That is, the current flow through the path A3 can be suppressed.

Of the three current paths A1, A2, and A3, the current flow through the paths A2 and A3 is suppressed, so that the current flow through the path A1 is also suppressed. This makes it possible to suppress the generation of the shaft current and the occurrence of the electrolytic corrosion in the bearings 21 and 22.

Since the insulator 18 is attached to the end portion 15b of the shaft 15, the end portion 15b of the shaft 15 can be worked to be thin and the cylindrical insulator 18 can be attached to the end portion 15b. Thus, the manufacturing cost can be reduced.

The insulator 18 may be provided not only between the shaft 15 and the second bearing 22 but also between the shaft 15 and the first bearing 21. It is also possible to provide the insulators 18 between the shaft 15 and the first bearing 21 and between the shaft 15 and the second bearing 22.

Effects of Embodiment

As described above, the motor 100 of the first embodiment includes the consequent pole rotor 1, the stator 5 surrounding the rotor 1 from outside in the radial direction, the first bearing 21 and the second bearing 22 supporting the shaft 15 of the rotor 1, the bracket 6 (first bearing support portion) having the inner circumferential surface 61a facing the outer circumferential surface 21d of the first bearing 21, and the bearing support portion 42 (second bearing support portion) having the inner circumferential surface 42a facing the outer circumferential surface 22d of the second bearing 22. The first bearing 21 is located on the load side, and the second bearing 22 is located on the counter-load side. The distance D1 from the center axis C1 to the inner circumferential surface 61a of the bracket 6, the distance D2 from the center axis C1 to the inner circumferential surface 42a of the bearing support portion 42, the distance d1 from the center axis C1 to the outer circumferential surface 21d of the first bearing 21, and the distance d2 from the center axis C1 to the outer circumferential surface 22d of the second bearing 22 satisfy D1−d1<D2−d2.

With this configuration, a gap on the outer circumferential side of the first bearing 21 applied with a larger load in the radial direction is made smaller than a gap on the outer circumferential side of the other second bearing 22, and thus the outer ring 21b of the first bearing 21 can be made less likely to move in the circumferential direction. In this way, the occurrence of the outer circumferential creep can be suppressed, and the performance of the motor 100 can be improved.

When the distance D1 is smaller than the distance D2, the first bearing 21 and the second bearing 22 having the same outer diameter can be used, and thus the manufacturing cost can be reduced.

When the distance d1 is larger than the distance d2, the cylindrical portion 61 of the bracket 6 and the bearing support portion 42 can be formed to have the same inner diameter, and thus the manufacturing cost can be reduced.

Since the bracket 6 is composed of a metal and the bearing support portion 42 is composed of a resin, the first bearing 21 to which a larger load in the radial direction is applied can be held by the bracket 6 with high positional accuracy. When the bearing support portion 42 is composed of a resin, the manufacturing cost can be reduced.

Since the inner diameter of the first bearing 21 and the inner diameter of the second bearing 22 are the same, the outer diameter of the portion of the shaft 15 held by the first bearing 21 and the outer diameter of the portion of the shaft 15 held by the second bearing 22 can be made the same, and thus the manufacturing cost can be reduced.

Since the insulator 18 is provided between the shaft 15 and at least one of the first bearing 21 and the second bearing 22, the generation of the shaft current can be suppressed, and the occurrence of the electrolytic corrosion of the bearings 21 and 22 can be suppressed.

Since the resin part 30 is provided between the rotor core 10 and the shaft 15, the generation of the shaft current can be suppressed, and the occurrence of the electrolytic corrosion in the bearings 21 and 22 can be suppressed.

Second Embodiment

Figure 12:
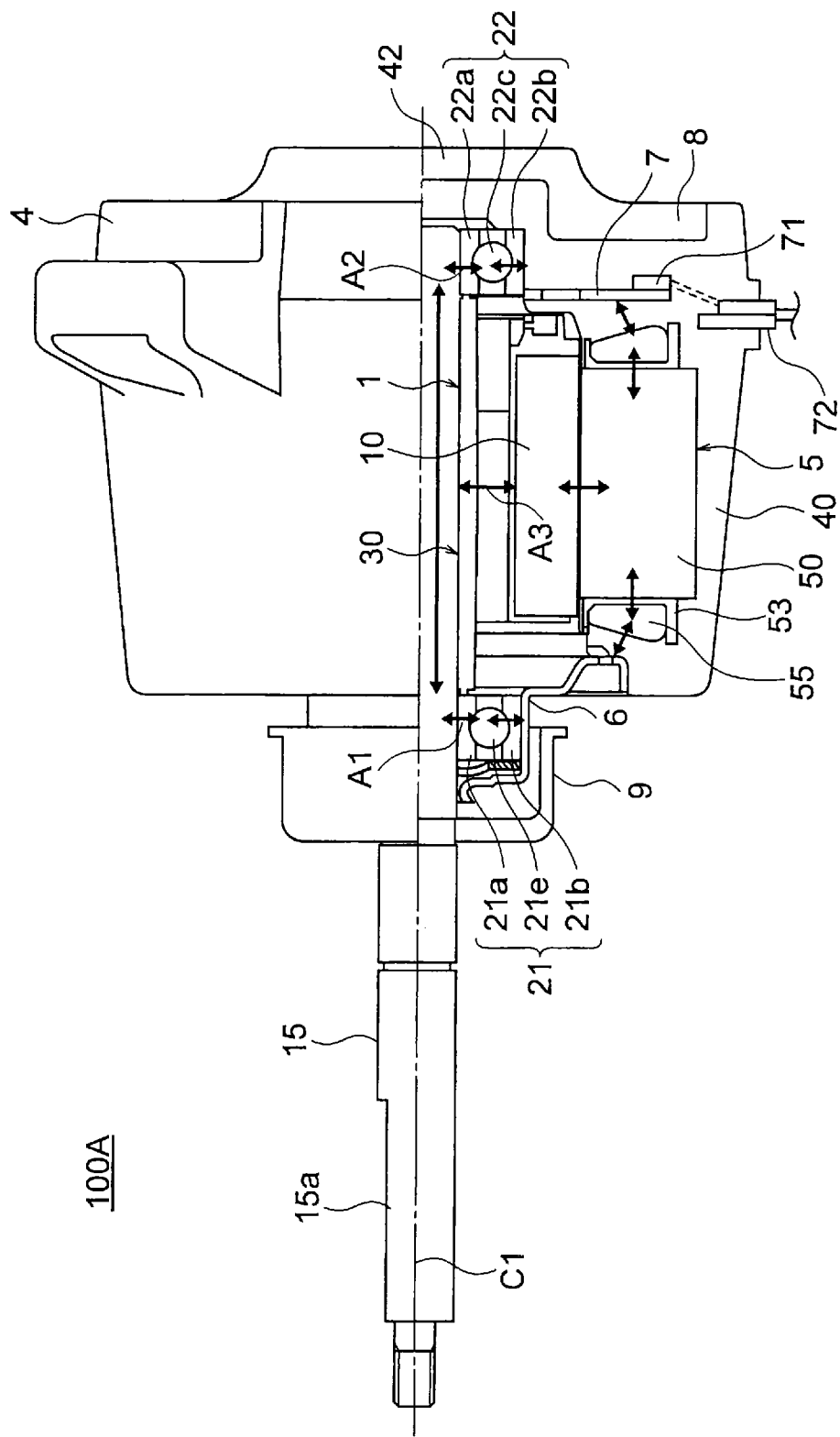
FIG. 12 is a longitudinal partial sectional view illustrating a motor according to a second embodiment.

Next, the second embodiment will be described. FIG. 12 is a longitudinal partial sectional view illustrating a motor 100A according to the second embodiment. The motor 100A of the second embodiment differs from the motor 100 of the first embodiment in the material of the rolling elements of the first bearing 21 or the rolling elements of the second bearing 22.

As illustrated in FIG. 12, the insulator 18 (FIG. 11) described in the first embodiment is not provided between the shaft 15 and the second bearing 22. That is, the inner circumferential surface of the second bearing 22 is in contact with the surface of the shaft 15.

Figure 13A:
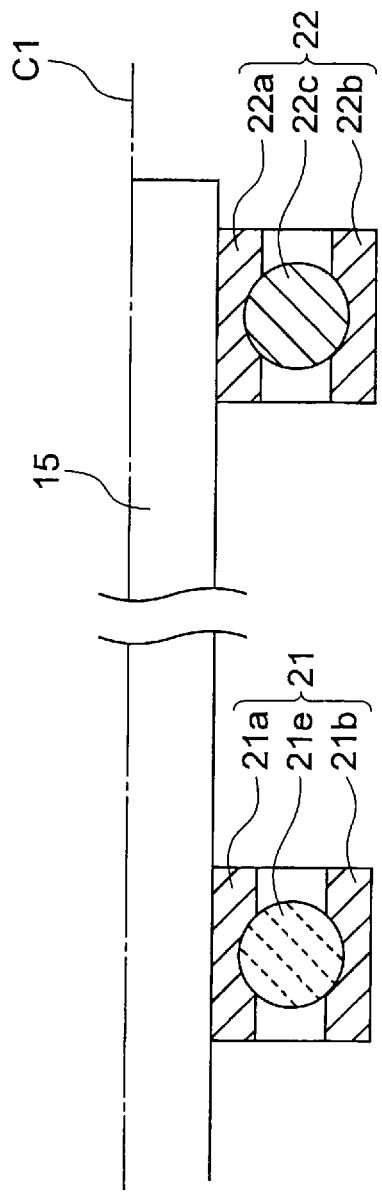
FIG. 13(A) is a diagram illustrating a first bearing and a second bearing of the second embodiment.

FIG. 13(A) is an enlarged view illustrating the first bearing 21 and the second bearing 22 of the second embodiment. The first bearing 21 of the second embodiment includes an inner ring 21a, an outer ring 21b, and a plurality of rolling elements 21e.

The rolling elements 21e of the first bearing 21 are composed of a ceramic. An example of the ceramic is alumina ($Al_2O_3$). However, besides alumina, any ceramic having strength required for the rolling element and insulating property can be used.

The structures of the inner ring 21a and the outer ring 21b of the first bearing 21 are as described in the first embodiment. The structure of the second bearing 22 is as described in the first embodiment.

Since the rolling elements 21e of the first bearing 21 are composed of a ceramic, the inner ring 21a and the outer ring 21b can be electrically insulated from each other. That is, the current flow through the path A1 described in the first embodiment can be suppressed.

As described in the first embodiment, the current flow through the path A3 is suppressed by the resin part 30 disposed between the rotor core 10 and the shaft 15.

Of the three current paths A1, A2, and A3, the current flow through the paths A1 and A3 is suppressed, so that the current flow through the path A2 is also suppressed. This makes it possible to suppress the generation of the shaft current and the occurrence of the electrolytic corrosion in the bearings 21 and 22.

Since the first bearing 21 on the load side receives a large load in the radial direction, an oil film of a lubricating oil around the rolling elements 21e tends to become thin. As the oil film is thinned, electrolytic corrosion is more likely to occur due to conduction. As the rolling elements 21e of the first bearing 21 is composed of a ceramic, the occurrence of the electrolytic corrosion can be suppressed even when the oil film is thinned.

In this example, the rolling elements 21e of the first bearing 21 are composed of a ceramic and the rolling elements 21c of the second bearing 22 are composed of a metal. However, it is sufficient that the rolling elements 21e of at least one of the bearings 21 and 22 are made of a ceramic.

Figure 13B:
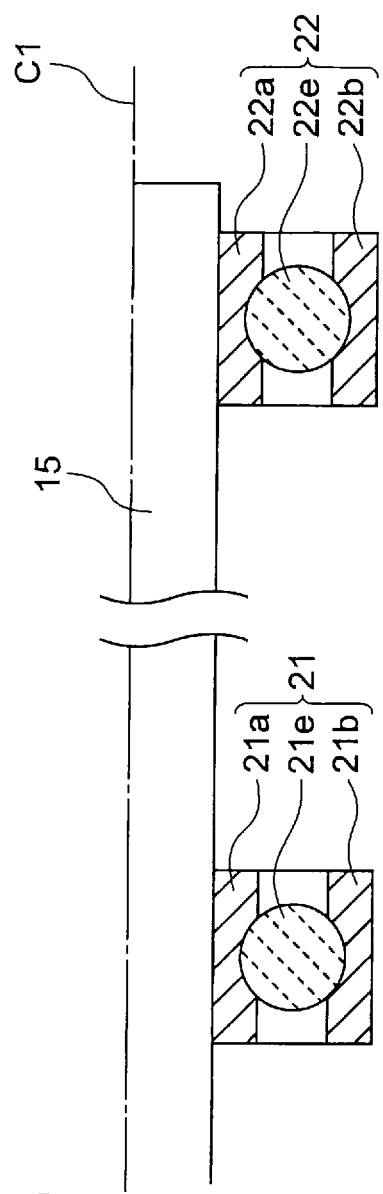
FIG. 13(B) is a diagram illustrating another example of the first bearing and the second bearing.

For example, as illustrated in FIG. 13(B), both the rolling elements 21e of the first bearing 21 and the rolling elements 22e of the second bearing 22 may be composed of a ceramic. With this configuration, the shaft current can be more effectively suppressed, and the effect of suppressing the occurrence of the electrolytic corrosion can be enhanced.

The insulator 18 may be provided between the shaft 15 and the second bearing 22 as described in the first embodiment.

The motor 100A of the second embodiment is configured in a similar manner to the motor 100 of the first embodiment, except for the points described above.

As described above, in the second embodiment, at least one of the first bearing 21 and the second bearing 22 for holding the shaft 15 includes rolling elements composed of a ceramic. Therefore, the shaft current can be effectively suppressed, and the effect of suppressing the occurrence of the electrolytic corrosion can be enhanced.

Third Embodiment

Figure 14:
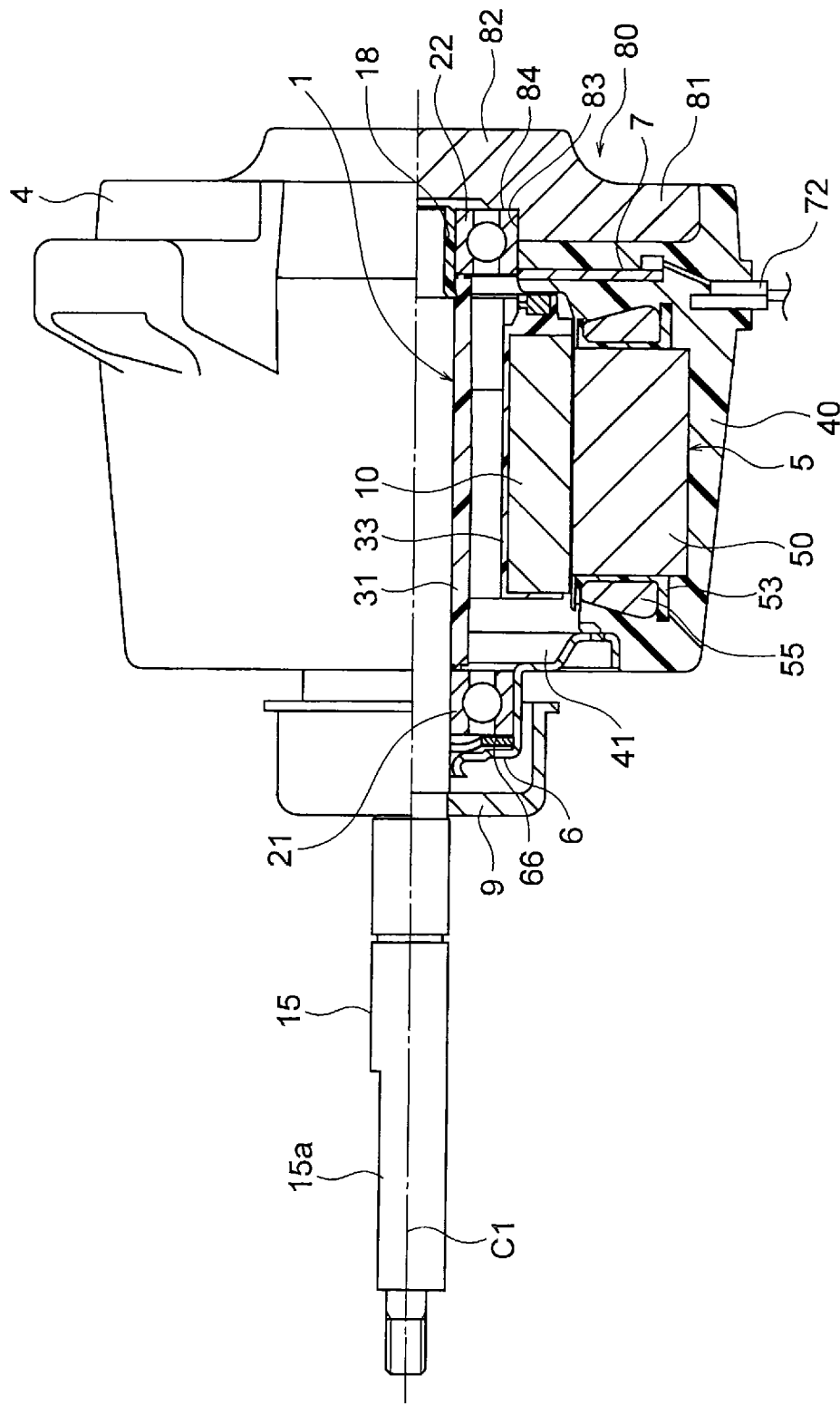
FIG. 14 is a longitudinal sectional view illustrating a motor according to a third embodiment.

Next, the third embodiment will be described. FIG. 14 is a longitudinal partial sectional view illustrating a motor 100B according to the third embodiment. The motor 100B of the third embodiment is different from the motor 100 of the first embodiment in that the motor 100B includes a bearing support member 80 made of a metal and serving as a second bearing support portion and does not include the heat dissipation plate 8 (FIG. 1).

The bearing support member 80 is provided so as to cover the counter-load side of the mold stator 4. The bearing support member 80 is composed of a metal. More specifically, the bearing support member 80 is composed of a hot-dip zinc-aluminum-magnesium alloy plated steel sheet. A hot-dip zinc-aluminum-magnesium alloy plated steel sheet is advantageous in that it can be subjected to press-working and has high dimensional accuracy.

The bearing support member 80 may alternatively be composed of an aluminum alloy such as ADC12 (JIS H5302). Since the aluminum alloy such as ADC12 can be processed by die casting, the degree of freedom of the shape is higher as compared with when extrusion molding or the like is used.

The bearing support member 80 has a flange portion 81 positioned on the outer side in the radial direction of the second bearing 22 and a plate-like portion 82 positioned on the counter-load side of the second bearing 22.

Figure 15:
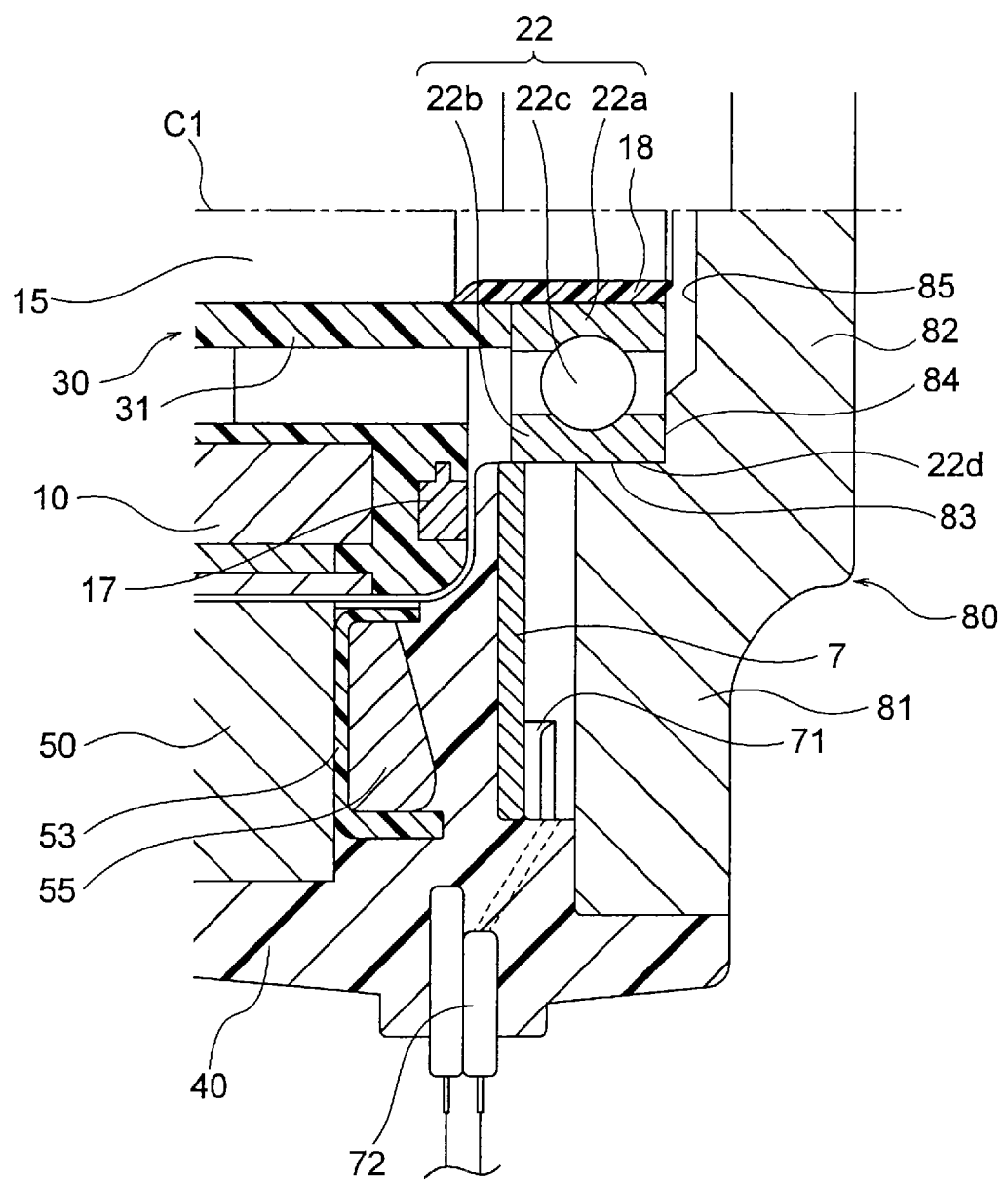
FIG. 15 is an enlarged longitudinal sectional view illustrating a part of the motor according to the third embodiment.

FIG. 15 is an enlarged view illustrating a part of the bearing support member 80. An inner circumferential surface 83 in contact with the outer circumferential surface 22d of the outer ring 22b of the second bearing 22 is formed in the flange portion 81 of the bearing support member 80. An end surface 84 in contact with the end surface in the axial direction of the outer ring 22b and a facing surface 85 facing the end surface in the axial direction of the inner ring 22a with a space therebetween are formed on the plate-like portion 82.

The bearing support member 80 is held by the mold resin portion 40. The outer circumferential side of the flange portion 81 of the bearing support member 80 is covered with the mold resin portion 40. The bearing support member 80 is separated from the circuit board 7, and the mold resin portion 40 is provided between the bearing support member 80 and the stator 5. That is, the bearing support member 80, the circuit board 7, and the stator 5 are not in contact with one another.

Since the bearing support member 80 is composed of a metal, the inner circumferential surface 83 of the bearing support member 80 can be formed with high dimensional accuracy as is the case with the inner circumferential surface 61a of the bracket 6. Therefore, D1−d1<D2−d2 described in the first embodiment is satisfied, and the gap (D2−d2) on the outer circumferential side of the second bearing 22 can be narrowed, and thus the occurrence of the outer circumferential creep can be suppressed.

Since a part of the bearing support member 80 is covered with the mold resin portion 40 and is not in contact with the circuit board 7 and the stator 5, the generation of the shaft current can be suppressed.

Since the bearing support member 80 is in contact with the outer ring 22b but is not in contact with the inner ring 22a, the current flow between the inner ring 22a and the outer ring 22b can be suppressed.

Since the bearing support member 80 is composed of a metal and a portion of the bearing support member 80 is exposed from the mold resin portion 40, the bearing support member 80 can also achieve a heat dissipation effect of dissipating heat generated in the coils 55 or the circuit board 7 to the outside.

Except for the points described above, the motor 100B of the third embodiment is configured in a similar manner to the motor 100 of the first embodiment.

As described above, in the third embodiment, since the metal bearing support member 80 (second bearing support portion) holds the second bearing 22, the gap on the outer circumferential side of the second bearing 22 can be narrowed, and the occurrence of the outer circumferential creep of the second bearing 22 can be suppressed.

In the first embodiment, the bracket 6 serving as the first bearing support portion is composed of a metal, and the bearing support portion 42 serving as the second bearing support portion is composed of a resin. In the third embodiment, both the bracket 6 and the bearing support member 80 are composed of a metal. However, both the first bearing support portion and the second bearing support portion may be composed of a resin such as BMC. Alternatively, the first bearing support portion may be composed of a resin, and the second bearing support portion may be composed of a metal.

(Air Conditioner)

Next, an air conditioner to which the above-described motors 100, 100A, and 100B of the first to third embodiments are applicable will be described. FIG. 16(A) is a diagram illustrating the configuration of an air conditioner 500 to which the motor 100 of the first embodiment is applied. The air conditioner 500 includes an outdoor unit 501, an indoor unit 502, and a refrigerant pipe 503 connecting the units 501 and 502.

The outdoor unit 501 includes an outdoor fan 510 such as a propeller fan, a compressor 504, and a heat exchanger 507. The outdoor fan 510 includes an impeller 505 and a motor 100 for driving the impeller 505. The configuration of the motor 100 is as described above in the first embodiment.

Figure 16B:
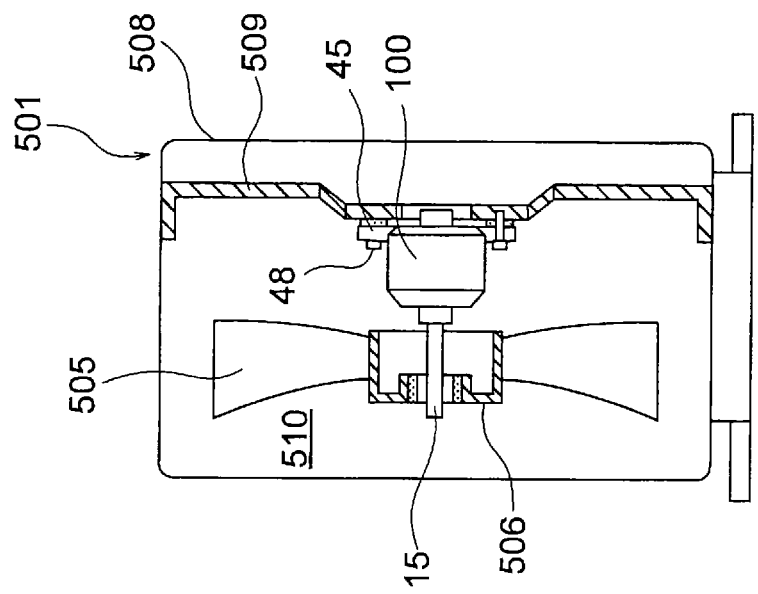
FIG. 16(B) is a sectional view illustrating an outdoor unit of the air conditioner.
Figure 16A:
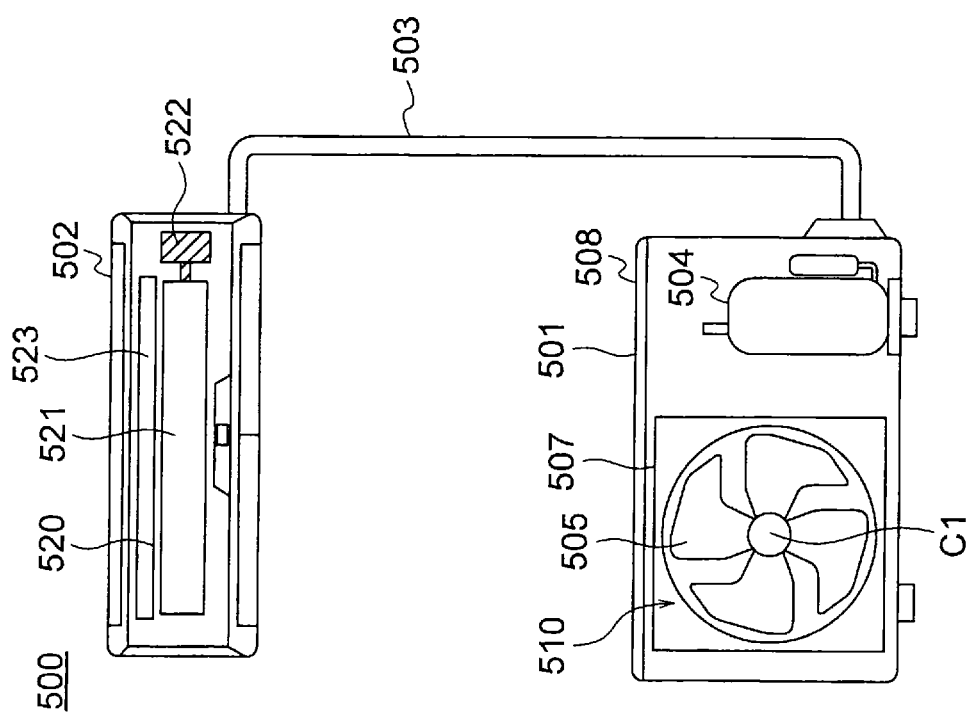
FIG. 16(A) is a diagram illustrating an air conditioner to which the motor of each embodiment is applicable.

FIG. 16(B) is a sectional view of the outdoor unit 501. The motor 100 is attached to a frame 509 disposed inside a housing 508 of the outdoor unit 501 by screws 48. The impeller 505 is attached to the shaft 15 of the motor 100 via a hub 506.

In the outdoor fan 510, the impeller 505 is rotated by the rotation of the motor 100 and blows air to the heat exchanger 507. During the cooling operation of the air conditioner 500, the heat released when the refrigerant compressed in the compressor 504 is condensed in the heat exchanger 507 (condenser) is released to the outside of the room by the air blowing by the outdoor fan 510.

The indoor unit 502 (FIG. 16(A)) includes an indoor fan 520 which is, for example, a cross flow fan, and a heat exchanger 523. The indoor fan 520 includes an impeller 521 and a motor 522 for driving the impeller 521.

In the indoor fan 520, the impeller 521 is rotated by the rotation of the motor 522 and blows air into the room. During the cooling operation of the air conditioner 500, the air deprived of heat when the refrigerant evaporates in the heat exchanger 523 (evaporator) is blown into the room by the air blowing by the indoor fan 520.

In the motor 100 described in the first embodiment, the outer circumferential creep is suppressed. Thus, the operation of the outdoor fan 510 can be stabilized for a long period of time, and thus the reliability of the air conditioner 500 can be improved.

The motor 100 of the first embodiment is used for the outdoor fan 510 in this example, but it is sufficient that the motor 100 of the first embodiment is used for at least one of the outdoor fan 510 and the indoor fan 520. In place of the motor 100 of the first embodiment, any of the motors 100A and 100B of the second and third embodiments may be used.

The motors 100, 100A, and 100B described in the first to third embodiments may also be mounted on electrical equipment other than the fan of an air conditioner.

Although the preferred embodiments of the present invention have been described above in detail, the present invention is not limited to the above-described embodiments, and various improvements or modifications can be made without departing from the gist of the present invention.

What is claimed is:

1. A motor comprising:
   a rotor having a shaft, a rotor core surrounding the shaft from outside in a radial direction about a center axis of the shaft, and a permanent magnet attached to the rotor core, the permanent magnet forming a magnet magnetic pole, a part of the rotor core forming a virtual magnetic pole;
   a stator surrounding the rotor from outside in the radial direction;
   a first bearing and a second bearing supporting the shaft; and
   a first bearing support portion having an inner circumferential surface facing an outer circumferential surface of the first bearing; and
   a second bearing support portion having an inner circumferential surface facing an outer circumferential surface of the second bearing,
   wherein one side of the shaft in a direction of the center axis is defined as a load side to which a load is applied;
   wherein, of the first bearing and the second bearing, the first bearing is located on the load side;
   wherein a distance D1 from the center axis to the inner circumferential surface of the first bearing support portion, a distance D2 from the center axis to the inner circumferential surface of the second bearing support portion, a distance d1 from the center axis to the outer circumferential surface of the first bearing, and a distance d2 from the center axis to the outer circumferential surface of the second bearing satisfy D1−d1<D2−d2, and
   wherein D1<D2 and d1=d2 are both satisfied, or d1>d2 is satisfied.

2. The motor according to claim 1, wherein D1=D2 is further satisfied.

3. The motor according to claim 1, wherein the first bearing support portion is composed of a metal, and
   wherein the second bearing support portion is composed of a resin.

4. The motor according to claim 1, wherein the first bearing support portion is composed of a metal, and
   wherein the second bearing support portion is composed of a metal.

5. The motor according to claim 4, further comprising a mold resin portion holding the first bearing support portion and the second bearing support portion.

6. The motor according to claim 1, wherein the first bearing and the second bearing have a same inner diameter.

7. The motor according to claim 1, further comprising an insulator provided between the shaft and at least one of the first bearing and the second bearing.

8. The motor according to claim 1, wherein the rotor has a resin part between the rotor core and the shaft.

9. The motor according to claim 1, wherein at least one of the first bearing and the second bearing has a rolling element composed of a ceramic.

10. The motor according to claim 9, wherein the first bearing has a rolling element composed of a ceramic.

11. The motor according to claim 9, wherein each of the first bearing and the second bearing has a rolling element composed of a ceramic.

12. A fan comprising:
    the motor according to claim 1; and
    an impeller rotated by the motor.

13. An air conditioner comprising:
    an outdoor unit; and
    an indoor unit connected to the outdoor unit via a refrigerant pipe,
    wherein at least one of the outdoor unit and the indoor unit has the fan according to claim 12.

* * * * *